(12) United States Patent
Denton

(10) Patent No.: US 9,994,746 B2
(45) Date of Patent: Jun. 12, 2018

(54) SWELLABLE PACKER SEAL COMPOSITION

(71) Applicant: RL HUDSON & COMPANY, Broken Arrow, OK (US)

(72) Inventor: Robert Denton, Pearland, TX (US)

(73) Assignee: RL Hudson & Company, Broken Arrow, OK (US)

( * ) Notice: Subject to any disclaimer, the term of this patent is extended or adjusted under 35 U.S.C. 154(b) by 0 days. days.

(21) Appl. No.: 15/148,290

(22) Filed: May 6, 2016

(65) Prior Publication Data

US 2017/0321097 A1  Nov. 9, 2017

(51) Int. Cl.
  *C09K 3/10* (2006.01)

(52) U.S. Cl.
  CPC .......... *C09K 3/1009* (2013.01); *C09K 3/1006* (2013.01)

(58) Field of Classification Search
  CPC ....... C09K 3/10; C09K 3/1009; C09K 3/1006
  USPC ...................................................... 502/402
  See application file for complete search history.

(56) References Cited

U.S. PATENT DOCUMENTS

| | | | |
|---|---|---|---|
| 7,132,479 B2 * | 11/2006 | Engelhardt | A61L 15/60 428/393 |
| 7,665,538 B2 | 2/2010 | Robisson et al. | |
| 8,181,708 B2 | 5/2012 | Korte | |
| 8,912,256 B2 | 12/2014 | Breach | |
| 2009/0126947 A1 | 5/2009 | King | |
| 2009/0139710 A1 | 6/2009 | Robisson et al. | |
| 2009/0211767 A1 | 8/2009 | Nutley et al. | |
| 2009/0312182 A1* | 12/2009 | Funk | A61L 15/60 502/402 |
| 2011/0290472 A1 | 12/2011 | Doweidt et al. | |
| 2012/0119445 A1 | 5/2012 | Castillo et al. | |
| 2012/0208934 A1 | 8/2012 | Korte | |
| 2013/0096038 A1 | 4/2013 | Kim et al. | |
| 2013/0269797 A1 | 10/2013 | Choi et al. | |
| 2016/0138359 A1 | 5/2016 | Zhao et al. | |
| 2016/0245062 A1 | 8/2016 | Themig | |
| 2016/0289510 A1 | 10/2016 | Seyger | |

FOREIGN PATENT DOCUMENTS

| | | |
|---|---|---|
| EP | 1315883 B1 | 3/2006 |
| WO | 2015072858 A2 | 5/2015 |

OTHER PUBLICATIONS

Dehbari, et al., "Water Swellable Rubber Composites: An update review from preparation to properties", 2015, pp. 1-11, vol. 10:1002, No. 42786, Publisher: Journal of Applied Polymer Science, Published in: US.

* cited by examiner

*Primary Examiner* — Edward Johnson
(74) *Attorney, Agent, or Firm* — David G. Woodral; Gabie Gotwals

(57) ABSTRACT

A composition for use as a swellable seal includes a base polymer, a super absorbent polymer, and a predetermined amount of cotton flock.

4 Claims, 2 Drawing Sheets

SWELLABLE PACKER SEAL COMPOSITION

FIELD OF THE INVENTION

This disclosure relates to swellable seals in general and, more particularly, to a composition with controllable swell rates suitable for use as a packer seal.

BACKGROUND OF THE INVENTION

Annular spaces and other cavities, particularly in downhole and drilling environments may be bifurcated, isolated, sealed, or otherwise divided by a packer. The packer is a mechanical device that may be placed in the appropriate location before being expanded by some means to both remain solidly in place and to seal the bore or other cavity. Other packers are sized appropriately such that they are not expanded after being set in place but fit tightly enough to perform their function. A part of the packer may include a material that reacts with the fluids in the well bore to swell in order to create an effective seal. The total amount of swelling of such a material, as well as the rate of swell, is critical to both proper placement and function of the associated packer.

What is needed is a device and composition for a seal that addresses the above, and related, issues.

SUMMARY OF THE INVENTION

The invention of the present disclosure, in one aspect thereof, comprises a composition for use as a swellable seal including a base polymer, a super absorbent polymer, and a predetermined amount of cotton flock. The super absorbent polymer may comprise one of a modified hydroxyl methyl cellulose, a potassium salt of crosslinked polyacrylic acid, and a polyacrylic copolymer. The base polymer may comprise one of Nipol DN401L, chlorinated polyethylene, Vistalon 3666, and Royalene 580HT. In various embodiments, the composition may also include a polyacrylic copolymer, a hydrocarbon resin, and/or a hydroxyl methyl cellulose.

The invention of the present disclosure, in another aspect thereof, comprises a composition for use as a swellable seal including about 100 phr of a base polymer, about 125 phr of a potassium salt of crosslinked polyacrylic acid, and about 5 phr of a cotton flock. In some embodiments, the 100 phr of a swellable polymer is selected from chlorinated polyethylene and Royalene 580HT.

In some embodiments, the composition may also include about 15 phr of N110, about 50 phr of clay, about 1 phr of stearic acid, about 1 phr of a solid aromatic amine antioxidant, about 0.5 phr of sulfur, about 0.75 phr of a mercaptobenzthiazole disulfide, and about 0.75 phr of a tetramethyl thiuram disulfide. The composition may also include about 5 phr of a hydrocarbon resin.

The invention of the present disclosure, in another aspect thereof, comprises a method of preparing a swellable seal composition. The method includes providing a predetermined quantity of a base polymer, providing a predetermined quantity of a super absorbent polymer, and blending a predetermined amount of cotton flock into the base polymer and the super absorbent polymer in the absence of a plasticizer. In some embodiments, the base polymer is an ethylene propylene diene monomer. The super absorbent polymer may be a potassium salt of crosslinked polyacrylic acid. In another embodiment, the super absorbent polymer is modified hydroxyl methyl cellulose. The base polymer may be a chlorinated polyethylene or an oil extended polymer.

In some embodiments, the method includes mixing into the composition a predetermined amount of hydrocarbon resin. In another embodiment, the method includes mixing the composition in the absence of any water dispersed materials.

DETAILED DESCRIPTION OF THE PREFERRED EMBODIMENTS

Figure 1:
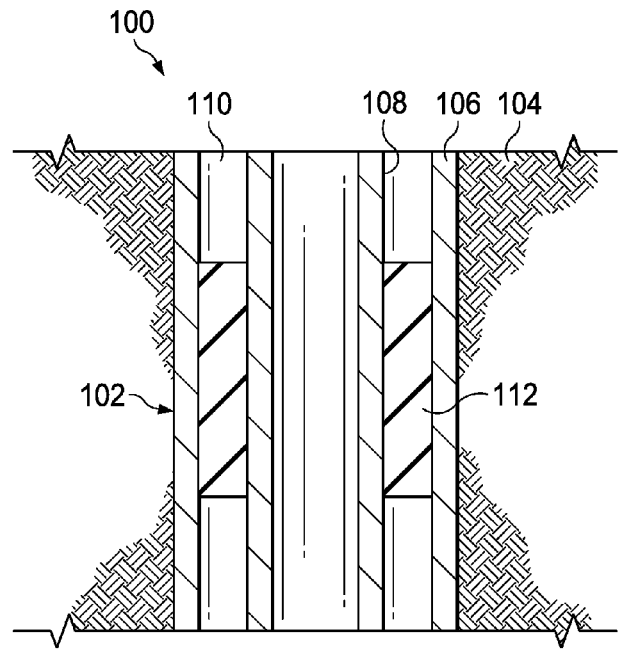
FIG. 1 is a side cutaway view of an exemplary packer in a downhole environment according to aspects of the present disclosure.

Referring now to FIG. 1, a side cutaway view of an exemplary packer in a downhole environment according to aspects of the present disclosure is shown. The environment 100 may include a well or hole 102 bored into earth 104 or other substrate. The hole 102 may or may not already be provided with a casing wall 106 previously placed as is known in the art. An exemplary interior packer 108 or other tool may be placed into the well bore and use to isolate one portion of the well bore 102 from another. In the present example, the packer 108 is placed into the well 102 creating an open annulus 110 between the packer 108 and wall 106. A swellable seal 112 may be provided around the packer 108 and hence occupy part of the annulus 110. The seal 112 may comprise various compositions as described hereinbelow that react with the environmental fluids (e.g., salt water or brine) to swell against the packer 108 and/or wall 106 to effectively seal off a portion of the bore or hole 102. Not only may the extent and rate of swelling be controllable as herein described, but the initiation of all or part of the swelling may be delayed depending upon components of the composition.

The sealing material of the present disclosure also provides increased contact sealing force and resistance to high temperatures and steam relative to previous sealing materials. Moreover, unlike some prior art compositions, in at least some embodiments, the present compositions do not rely on combinations of absorbent materials, liquid dispersed materials, or any sort of plasticizer.

Table 1, below, illustrates a number of exemplary embodiments of the compositions of the present disclosure. Each column, (a)-(f), denotes one specific exemplary mixture. The units are provided in parts per hundred parts rubber (phr), as is customary in dealing with rubber compositions. Normally a composition begins with a quantity that would be considered 100 parts rubber (or whatever other base material is being used) and the remaining components are expressed in terms of additional parts to be added. Note that column (c) below begins not with 100 parts, but with 175 parts. This particular embodiment represents an oil extruded polymer starting with a base of 100 phr, with an additional 75 of oil, before adding additional components. Where appropriate, the constituent component ingredients are denoted by trade name. If a generic or competing component of substantially identical composition and properties is or becomes available, the same may be substituted.

The trade names used below may be registered to their respective suppliers. Nipol® DN401L is a low nitrile rubber currently available from Zeon Corporation; chlorinated polyethylene is currently available from a number of suppliers; Vistalon™ 3666 is an ethylene propylene diene monomer (EPDM) rubber currently available from Exxon Mobile Corporation; Royalene® 580HT is an EPDM rubber currently available from Lion Copolymer LLC. These polymers may considered as base polymers in that they are suitable for using as a seal or blocking member within harsh environments (e.g., downhole) but they do not expand suitably (on their own) upon exposure to water or other typically encountered wellbore fluids to be used as a swellable seal or packer.

To provide for expansion of the packer or seal, a super absorbent polymer ("SAP") may be combined with the base polymer. SAPs are characterized by their ability to absorb and retain very high amounts of liquid relative to their mass. One suitable SAP is Liquiblock™, a potassium salt of crosslinked polyacrylic acid/polyacrylic copolymer available from Emerging Technologies, Inc. (the present examples use Liquiblock™ 40F but other Liquiblock™ products are suitable as well). Walocel™, available from Dow Chemical Co., may be used with some polymers in place of the Liquiblock™. The Walocel™ product in the present examples is MKX 45000 PP 10, a modified hydroxyl methyl cellulose (HEMC) used as a thickener and binder. These absorbing components are mixed and combined with the base polymers to allow the polymer to absorb the environmental liquids and moisture, resulting in swelling of the packer or seal.

Cotton flock is utilized with the embodiments of the present disclosure in order to increase cohesive strength, rigidity and body, as described in greater detail below. Although various cotton flocks may be used, in the present examples, the cotton flock was obtained from Akrochem Corporation. Cumar P25 is a dry coumarone indene resin available from Hallstar Innovations Corp. and may be used to delay packer swelling, as discussed below.

Other additives may form part of the composition of the packer material as well and may be used to control desired properties of the packer or seal after the swell. N110 and N220 are carbon blacks available from multiple suppliers; Maglite D is a magnesium oxide powder available from multiple suppliers; VUL-CUP® 40KE is an organic peroxide available from GEO Specialty Chemicals; Naugard® 445 is a solid aromatic amine antioxidant available from Chemtura Corporation; and MBTS is mercaptobenzthiazole disulfide available from multiple suppliers; TMTD is tetramethyl thiuram disulfide available from multiple suppliers. These additional additives are not meant to be an exhaustive list, as other known additives may be incorporated.

TABLE 1

| seal composition formulations | | | | | | |
|---|---|---|---|---|---|---|
| | a | b | c | d | e | f |
| Nipol DN401 L | | | | | | 100 |
| Chlorinated Polyethylene | | 100 | | | | |
| Vistalon 3666 | | | | 175 | | |
| Royalene 580HT | 100 | | 100 | | 100 | |
| Liquiblock | 125 | 125 | 125 | 125 | 0 | 125 |
| Walocel | | | | | 125 | |
| N110 | 15 | | 15 | 15 | 15 | |

TABLE 1-continued

| seal composition formulations | | | | | | |
|---|---|---|---|---|---|---|
| | a | b | c | d | e | f |
| N220 | | 30 | | | | |
| Clay | 50 | | 50 | 50 | 50 | 50 |
| Maglite D | | 5 | | | | |
| Cotton Flock | 5 | 5 | 5 | 5 | 5 | |
| ZnO | 5 | | 5 | 5 | 5 | 5 |
| VUL-CUP 40KE | | 3 | | | | |
| Stearic Acid | 1 | | 1 | 1 | 1 | 0.5 |
| Naugard 445 | 1 | | 1 | 1 | 1 | 1 |
| Sulfur | 0.5 | | 0.5 | 0.5 | 0.5 | 0.5 |
| MBTS | 0.75 | | 0.75 | 0.75 | 0.75 | 1.5 |
| TMTD | 0.75 | | 0.75 | 0.75 | 0.75 | 1.5 |
| Cumar P25 Resin | 0 | | 5 | | | |

The presently disclosed sealing material compositions offer greater contact sealing force after expansion of a vulcanized seal than previously available. Cotton is added to the composition to increase cohesive strength, rigidity, and body to the end product, as well as increased green strength for processing. Cotton of different fiber sizes (length) may be suitable but those in the range of 75 micron-150 micron range work well. Table 1, above, indicates addition of cotton flock at about 5 phr. However, cotton flock added in ranges from 1% by weight up to 50% by total weight of the composition may show enhanced performance over the base polymer. Addition of cotton prevents crumbling during the process stage and increases wicking action for onset of swelling. One significant aspect of this these disclosed compositions is that the material does not rely upon decreased crosslink density to achieve swelling. The higher crosslink densities of the disclosed compositions is directly responsible for the generation of higher contact sealing force when the elastomer swells, which permits sealing at higher differential pressures in service.

Referring to the composition in column (a) of Table 1, contact sealing force exceeds normally encountered system pressures due to the compound chemistry and addition of cotton. Previous swellable seals may offer adequate expansion, but lack the necessary contact sealing force to counter higher system pressures, especially under adverse conditions of temperature and fluid attack. The present compositions also offer greater ease of processing and manufacture of end articles. The disclosed novel chemistry and compositions exhibit greater contact sealing force and permit the use of lower cost polymers, such as EPDM, in applications where nitrile butadiene rubber (NBR) or hydrogenated nitrile butadiene rubber (HNBR) polymers were previously utilized. This substitution lowers cost and improves resistance to steam and elevated temperature.

Figure 2:
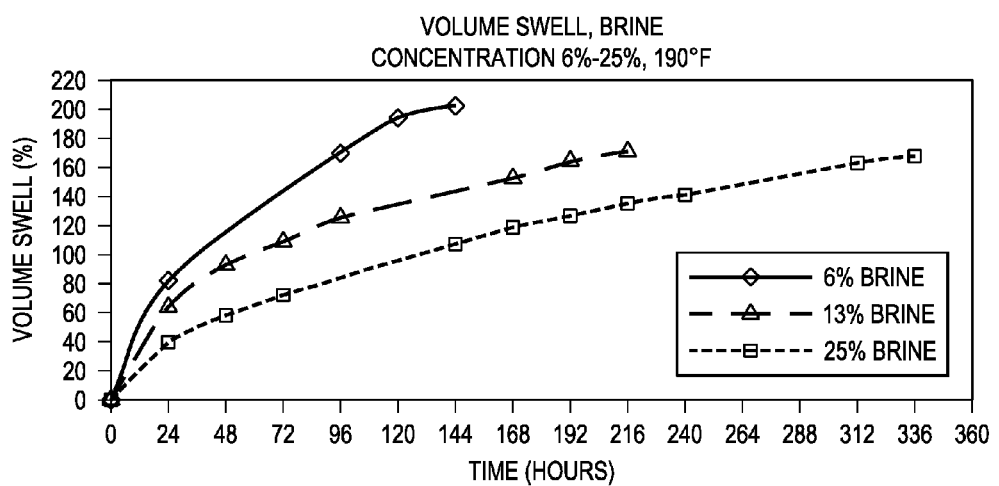
FIG. 2 is a graph of volume swell over time for a seal composition of the present disclosure.

FIG. 2 illustrates the performance in terms of volume of swelling as a percentage of the composition of column (a) over time at 190° F. at brine concentrations of 6%, 13%, and 25%.

In addition to EPDM, chlorinated polyethylene may be used as an acceptable substitute elastomer as shown in the composition in column (b) of Table 1.

Figure 3:
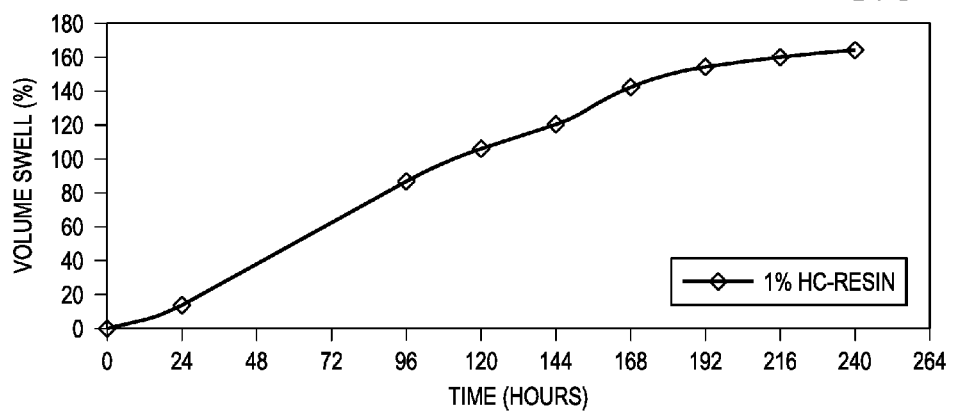
FIG. 3 is a graph of volume of swell over time for a seal composition of the present disclosure imbued with a hydrocarbon resin.

A separate but still important property is the need to reduce, or delay, swelling of the seal to facilitate installation of a swellable packer. It has been found that the addition of a suitable hydrocarbon resin, such as CUMAR 25, for example, accomplishes this effect. Such a formulation is provided in column (c) of Table 1. The performance of a 1% resin formula (otherwise having the same composition of column (c)) is shown in FIG. 3. Here it can be seen that, particularly early on, the swelling is reduced compared to the composition shown in FIG. 2 though the final swell rate is roughly equivalent (when compared against the 25% data line).

It has also been discovered that utilizing an oil-extended polymer such as Vistalon 3666 will also delay expansion of the swellable packer over its baseline. Such a formulation is provided in column (d) of Table 1. The materials disclosed above produce swells of greater than 150% within 336 hours with brine concentrations of 0.0% to 25%.

Figure 4:
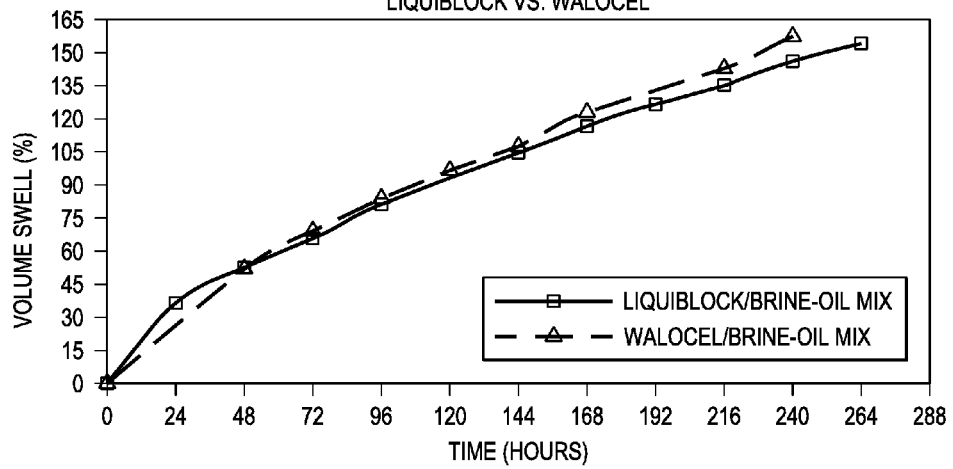
FIG. 4 is a graph of volume of swell over time for seal compositions of the present disclosure based upon hydroxyethyl methyl cellulose (Walocel®), and another potassium salt of crosslinked polyacrylic acid (Liquiblock™).

In another embodiment of a swellable seal composition, Walocel MKX 45000 PP 10 modified hydroxyethyl methyl cellulose (HEMC) is an acceptable substitute for the Super Absorbent Polymer polyacrylamide listed in column (f). This composition is shown in column (e) of Table 1. Other polymers, such as NBR and chlorinated polyethylene (CPE) may also be used in the swellable seal composition shown in column (f) (these not shown in table). It should be understood that, although these particular polymers are cited, the present disclosure is not limited to only these polymers since the technology of the present disclosure applies to all water swellable polymer compositions. FIG. 4 illustrates a comparison of the performance of the composition of column (e) utilizing Walocel versus the composition of column (f) utilizing Liquiblock similar to formulations (a)-(d).

The compositions disclosed herein are utilized without plasticizers and do not rely on any liquid dispersed materials, unlike some prior art composition. In various embodiments, the compositions have no ingredients other than those listed in Table 1. In other embodiments, ingredients not listed in the table (which might be considered contaminants in the present context) are minimized such that the performance of the seal is not perceptibly affected.

Once a suitable composition or formulation for the seal is chosen, the individual ingredients are converted into a useable, homogeneous mixture. The polymer, fillers, specialty materials, and vulcanizing agents must be brought together in an efficient manner that ensures a homogeneous, batch-to-batch uniformity. Such process is known in the art as rubber mixing. The ingredients are fed into an appropriate mixer at a correct time, and correct temperature. Physical mixing of the ingredients produces a homogeneous state where no individual ingredient is recognizable apart from the composition. The mixed ingredients may be discharged from the mixer on to a mill for cooling, shaping, and preparation for next process stage.

Uniformity and consistency being critical for proper function of the seal or other final product. The majority of rubber mixing is carried out in internal match mixers having completely enclosed mixing chambers. One suitable mixer is the Banbury® mixer produced by Farrel Corporation. Before mixing is commenced, ingredient weights are calculated to ensure the Banbury is properly filled based on the parameters of the chosen composition.

According to the formulas and compositions above, a swellable seal (e.g., seal 112 of FIG. 1) is fabricated from the rubber compound and vulcanized in an autoclave, or other curing apparatus. The seal 112 may then be placed downhole in an oil or gas system and, after a timed installation delay, forms a tight seal when exposed to various drilling fluids which may be of an oil base, or a brine solution, or water. The expanded seal effectively blocks the flow of fluids under pressure, sealing off the well bore (e.g., well bore 102) and permitting the isolated zone of the well to be cemented for acidizing, testing, or fracturing. Packer elements are also used in injection wells to isolate the zones into which water is to be injected.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A composition for use as a swellable seal comprising:
   about 100 phr of a base polymer;
   about 125 phr of a potassium salt of crosslinked polyacrylic acid; and
   about 5 phr of a cotton flock.

2. The composition of claim 1, wherein the 100 phr of a swellable polymer is selected from chlorinated polyethylene and Royalene 580HT.

3. The composition of claim 2, further comprising about:
   about 15 phr of N110;
   about 50 phr of clay;
   about 1 phr of stearic acid;
   about 1 phr of a solid aromatic amine antioxidant;
   about 0.5 phr of sulfur;
   about 0.75 phr of a mercaptobenzthiazole disulfide; and
   about 0.75 phr of a tetramethyl thiuram disulfide.

4. The composition of claim 3, further comprising about 5 phr of a hydrocarbon resin.

* * * * *